US012742099B2

(12) United States Patent
Fukai et al.

(10) Patent No.: US 12,742,099 B2
(45) Date of Patent: Sep. 22, 2026

(54) RESIN COMPOSITION, POLYURETHANE ADHESIVE AGENT, AND LAYERED PRODUCT

(71) Applicant: DAINICHISEIKA COLOR & CHEMICALS MFG. CO., LTD., Tokyo (JP)

(72) Inventors: Masaki Fukai, Tokyo (JP); Harumasa Satou, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 260 days.

(21) Appl. No.: 18/834,188

(22) PCT Filed: Mar. 13, 2023

(86) PCT No.: PCT/JP2023/009709
§ 371 (c)(1),
(2) Date: Jul. 29, 2024

(87) PCT Pub. No.: WO2023/176799
PCT Pub. Date: Sep. 21, 2023

(65) Prior Publication Data

US 2025/0154386 A1 May 15, 2025

(30) Foreign Application Priority Data

Mar. 18, 2022 (JP) ................................. 2022-043932
Sep. 12, 2022 (JP) ................................. 2022-144714

(51) Int. Cl.

| | |
|---|---|
| ***C09J 7/35*** | (2018.01) |
| ***B32B 3/30*** | (2006.01) |
| ***B32B 7/12*** | (2006.01) |
| ***B32B 15/04*** | (2006.01) |
| ***B32B 15/088*** | (2006.01) |
| ***B32B 15/20*** | (2006.01) |
| ***B32B 27/08*** | (2006.01) |
| ***B32B 27/32*** | (2006.01) |
| ***B32B 27/34*** | (2006.01) |
| ***C09J 5/06*** | (2006.01) |

(52) U.S. Cl.
CPC ..................................... *C09J 7/35* (2018.01); *B32B 3/30* (2013.01); *B32B 7/12* (2013.01); *B32B 15/043* (2013.01); *B32B 15/088* (2013.01); *B32B 15/20* (2013.01); *B32B 27/08* (2013.01); *B32B 27/32* (2013.01); *B32B 27/34* (2013.01); *C09J 5/06* (2013.01); *B32B 2250/40* (2013.01); *B32B 2255/06* (2013.01); *B32B 2255/10* (2013.01); *B32B 2255/26* (2013.01); *B32B 2307/306* (2013.01); *B32B 2307/31* (2013.01); *B32B 2307/748* (2013.01); *B32B 2439/40* (2013.01); *B32B 2439/70* (2013.01); *C09J 2301/304* (2020.08); *C09J 2400/166* (2013.01); *C09J 2475/00* (2013.01)

(58) Field of Classification Search
CPC ........... B32B 3/30; B32B 7/12; B32B 15/043; B32B 15/088; B32B 15/20; B32B 27/08; B32B 27/32; B32B 27/34; C09J 7/35; C09J 5/06
See application file for complete search history.

(56) References Cited

U.S. PATENT DOCUMENTS

| | | | |
|---|---|---|---|
| 2014/0370368 | A1 | 12/2014 | Kaibin et al. |
| 2020/0216729 | A1 | 7/2020 | Kolb et al. |

FOREIGN PATENT DOCUMENTS

| | | | | |
|---|---|---|---|---|
| CN | 101463242 | A | | 6/2009 |
| CN | 101463242 | B | * | 5/2012 |
| CN | 115806739 | A | * | 3/2023 |
| JP | 2007008999 | A | | 1/2007 |
| JP | 2008045101 | A | | 2/2008 |

(Continued)

OTHER PUBLICATIONS

International Search Report (with English translation) and Written Opinion issued in PCT/JP2023/009709, mailed Jun. 6, 2023, 9 pages.

(Continued)

*Primary Examiner* — Maria V Ewald
*Assistant Examiner* — Ethan Weydemeyer
(74) *Attorney, Agent, or Firm* — HSML P.C.

(57) ABSTRACT

There is provided a resin composition useful as a base resin of a polyurethane-based adhesive that makes it possible to form an adhesive layer excellent in adhesion and heat resistance, that is unlikely to cause a fault, such as floating and peeling, even when being subjected to shaping such as drawing and makes it possible to produce a laminate having a satisfactory appearance, and that is excellent in wettability to a substrate of a resin, a metal, or the like. The resin composition is a resin composition to be used as a base resin of an adhesive together with a curing agent, the resin composition being a resin composition for a polyurethane-based adhesive. The resin composition contains a polyol (A) containing 80% by mass or more of a polyurethane resin (c) having a constituent unit derived from a polyol containing a polyester polyol (a), wherein the polyester polyol (a) has a constituent unit derived from a dicarboxylic acid component containing benzene-o-dicarboxylic acid, the content of a terminal hydroxy group of the polyester polyol (a) is 0.1 to 2 mol/kg, and the content of a terminal hydroxy group of the polyurethane resin (c) is 0.04 to 0.4 mol/kg.

10 Claims, No Drawings

(56) References Cited

FOREIGN PATENT DOCUMENTS

| | | | | |
|---|---|---|---|---|
| JP | 2013249438 | A | | 12/2013 |
| JP | 2015013935 | A | | 1/2015 |
| JP | 2015024862 | A | | 2/2015 |
| JP | 2017025287 | A | | 2/2017 |
| JP | 2019099667 | A | | 6/2019 |
| JP | 2020531655 | A | | 11/2020 |
| JP | 2024033461 | A | * | 3/2024 |
| TW | 201500182 | A | | 1/2015 |

OTHER PUBLICATIONS

Office Action issued in Taiwanese Application No. 112109886, dated Oct. 27, 2023, with machine translation, 12 pages.

* cited by examiner

RESIN COMPOSITION, POLYURETHANE ADHESIVE AGENT, AND LAYERED PRODUCT

TECHNICAL FIELD

The present invention relates to a resin composition to be used as a base resin of a polyurethane-based adhesive together with a curing agent; a polyurethane-based adhesive; and a laminate.

BACKGROUND ART

Examples of the applications of laminates such as soft packaging materials include applications in which a laminate is deep-drawn to form a shaped body such as a packaging material; the shaped body is subsequently filled with the contents; and then the shaped body is subjected to heat sealing (for example, an application in food packaging, such as ham or bacon packaging). A hot plate at a high temperature is brought into contact with the laminate during the heat sealing, and on that occasion, so-called "floating" in which air bubbles are mixed between the layers may occur at a part where heat or stress is concentrated. When such "floating" conspicuously occurs, the molding depth (the filling volume of the contents) or the like is limited.

A polyester polyol is one of the raw materials for a polyurethane which is used as the base resin of a polyurethane-based adhesive. Generally, the use of a polyurethane obtained by using a polyester polyol as a raw material whose phthalic acid content is larger makes it possible to prepare an adhesive whose heat resistance and adhesion to a metal or the like is improved. However, as the phthalic acid content in the polyester polyol is larger, there is a tendency that the viscosity of the polyurethane increases to lower the fluidity. Therefore, in producing a laminate using an adhesive whose base resin is such a polyurethane as just described above, inclusion of air bubbles due to poor wetting is likely to occur, so that floating is likely to occur in a resultant laminate.

For example, there has been proposed an adhesive which instantly exhibits the adhesion to a substrate, such as a metal and a film made of a resin, by irradiation with an active energy ray (Patent Literature 1). In addition, there have been proposed: a shaped packaging material having NY/AL/PP layers; and an adhesive to be used therefor (Patent Literature 2). Note that there have been proposed: a polyester polyol whose phthalic acid content is large; and a technique for decreasing the viscosity of a polyurethane using the same (Patent Literatures 3 and 4), but these do not give an influence on the shapeability of laminates. Further, there has been proposed an adhesive composition containing a polyester urethane compound that contains a particular amount of a trifunctional or higher functional hydroxyl group (Patent Literature 5).

CITATION LIST

Patent Literature

Patent Literature 1: Japanese Patent Laid-Open No. 2015-13935

Patent Literature 2: Japanese Patent Laid-Open No. 2015-24862

Patent Literature 3: Japanese Patent Laid-Open No. 2007-8999

Patent Literature 4: Japanese Patent Laid-Open No. 2008-45101

Patent Literature 5: Japanese Patent Laid-Open No. 2017-25287

SUMMARY OF INVENTION

Technical Problem

The floating caused by, for example, inclusion of air bubbles due to poor wetting is per se a defect that impairs the aesthetic value of a laminate. In addition, even an inconspicuous small air bubble causes a problem that when the laminate is drawn for form, the bubble is extended to become large. Further, a small air bubble is expanded by heat during heat sealing, which is likely to cause more conspicuous floating or peeling. Therefore, even a small air bubble cannot be neglected.

It cannot be said that the fluidity and the wettability to a substrate of the adhesive proposed in Patent Literature 1 are very good. Particularly under roll-to-roll processing conditions taking productivity into consideration, thermocompression bonding is instantaneous, and therefore a fault caused by inclusion of air bubbles due to insufficient wettability may be likely to occur. In addition, with regard to the adhesive proposed in Patent Literature 2, the temperature during aging is relatively high, and therefore poor wetting is likely to occur under an aging condition of around 40° C., which is a temperature generally employed in soft packaging materials. For this reason, a fault caused by inclusion of air bubbles is likely to occur, and when aging is conducted at a high temperature, the adhesive proposed in Patent Literature 2 is disadvantageous in terms of energy costs. Further, when a laminate obtained using the adhesive composition proposed in Patent Literature 5 is subjected to drawing, a fault, such as floating or peeling, may occur, and therefore there is room for improvements in appearances of finished products.

The present invention has been completed in view of such problems of the conventional techniques, and an object of the present invention is to provide a resin composition useful as a base resin of a polyurethane-based adhesive that makes it possible to form an adhesive layer excellent in adhesion and heat resistance, that is unlikely to cause a fault, such as floating and peeling, even when being subjected to shaping such as drawing and makes it possible to produce a laminate having a satisfactory appearance, and that is excellent in wettability to a substrate of a resin, a metal, or the like.

Another object of the present invention is to provide a polyurethane-based adhesive that makes it possible to form an adhesive layer excellent in adhesion and heat resistance, that is unlikely to cause a fault, such as floating and peeling, even when being subjected to shaping such as drawing and makes it possible to produce a laminate having a satisfactory appearance, and that is excellent in wettability to a substrate of a resin, a metal, or the like.

Yet another object of the present invention is to provide a laminate that includes adhesive layers excellent in adhesion and heat resistance, that is unlikely to cause a fault, such as floating and peeling, even when being subjected to shaping such as drawing, and that has a satisfactory appearance.

Solution to Problem

Specifically, according to the present invention, it is possible to provide a resin composition described below.

[1]A resin composition to be used as a base resin of an adhesive together with a curing agent, the resin composition being a resin composition for a polyurethane-based adhesive and containing a polyol (A) that contains 80% by mass or more of a polyurethane resin (c) having a hydroxy group at each molecular terminal of the polyurethane resin (c), the polyurethane resin (c) having a constituent unit derived from a polyol containing a polyester polyol (a) and a constituent unit derived from a polyisocyanate (b), wherein the polyester polyol (a) has a constituent unit derived from a dicarboxylic acid component and a constituent unit derived from a diol component, the total content of benzene-o-dicarboxylic acid and benzene-m-dicarboxylic acid in the dicarboxylic acid component is 50 mol % or more, the content of benzene-o-dicarboxylic acid in the dicarboxylic acid component is 40 mol % or more, the content of a hydroxy group present at each molecular terminal of the polyester polyol (a) is 0.1 to 2 mol/kg, the content of the polyester polyol (a) in the polyol is 80% by mass or more, and the content of the hydroxy group present at each molecular terminal of the polyurethane resin (c) is 0.04 to 0.4 mol/kg.

[2] The resin composition according to [1], wherein the content of the hydroxy group present at each molecular terminal of the polyurethane resin (c) is 0.05 to 0.4 mol/kg.

[3] The resin composition according to [1] or [2], wherein the content of benzenedicarboxylic acid other than benzene-o-dicarboxylic acid in the dicarboxylic acid component is 20 mol % or more.

[4] The resin composition according to any one of [1] to [3], wherein the diol component contains a dialcohol having, in the molecule thereof, two or three C≤8 alkylene groups bonded through an ether bond, and the content of the dialcohol in the diol component is 50 mol % or more.

[5] The resin composition according to any one of [1] to [4], further containing 2% by mass or more of at least one organic solvent selected from the group consisting of ethyl acetate, methyl acetate, methyl ethyl ketone, and dimethyl carbonate.

In addition, according to the present invention, it is possible to provide a polyurethane-based adhesive described below.

[6]A polyurethane-based adhesive containing:

a base resin; and a curing agent, wherein the base resin is the resin composition according to any one of [1] to [5]

the curing agent is a polyisocyanate (B), and the stoichiometric ratio of a terminal isocyanate group (NCO group) of the polyisocyanate (B) to the terminal hydroxy group (OH group) of the polyol (A), (NCO group/OH group), is 2.0 to 50.0.

Further, according to the present invention, it is possible to provide a laminate described below.

[7]A laminate including:

two or more adherend layers; and an adhesive layer provided between the adherend layers and formed with the polyurethane-based adhesive according to [6].

[8] The laminate according to [7], wherein the adherend layers includes a metal layer.

[9] The laminate according to [7] or [8], having a shaped portion shaped into a depression.

[10] The laminate according to any one of [7] to [9], having a sealed portion subjected to heat sealing.

Advantageous Effects of Invention

The present invention makes it possible to provide a resin composition useful as a base resin of a polyurethane-based adhesive that makes it possible to form an adhesive layer excellent in adhesion and heat resistance, that is unlikely to cause a fault, such as floating and peeling, even when being subjected to shaping such as drawing and makes it possible to produce a laminate having a satisfactory appearance, and that is excellent in wettability to a substrate of a resin, a metal, or the like.

In addition, the present invention makes it possible to provide a polyurethane-based adhesive that makes it possible to form an adhesive layer excellent in adhesion and heat resistance, that is unlikely to cause a fault, such as floating and peeling, even when being subjected to shaping such as drawing and makes it possible to produce a laminate having a satisfactory appearance, and that is excellent in wettability to a substrate of a resin, a metal, or the like.

Further, the present invention makes it possible to provide a laminate that includes adhesive layers excellent in adhesion and heat resistance, that is unlikely to cause a fault, such as floating and peeling, even when being subjected to shaping such as drawing, and that has a satisfactory appearance.

DESCRIPTION OF EMBODIMENTS

<Resin Composition>

Hereinafter, embodiments of the present invention will be described, but the present invention is not limited to the following embodiments. One embodiment of a resin composition of the present invention is a resin composition to be used as a base resin of an adhesive together with a curing agent, the resin composition being a resin composition for a polyurethane-based adhesive. The resin composition of the present embodiment contains a polyol (A) that contains 80% by mass or more of a polyurethane resin (c) having a hydroxy group at each molecular terminal of the polyurethane resin (c), the polyurethane resin (c) having a constituent unit derived from a polyol containing a polyester polyol (a) and a constituent unit derived from a polyisocyanate (b). Hereinafter, details on the resin composition of the present embodiment will be described.

(Polyol (A))

The polyol (A) contains 80% by mass or more, preferably 90% by mass or more of a polyurethane resin (c) having a hydroxy group at each molecular terminal of the polyurethane resin (c). It is particularly preferable that the polyol(A) substantially consist of the polyurethane resin (c). When the content of the polyurethane resin (c) in the polyol (A) is less than 80% by mass, the adhesion of a resultant adhesive to a substrate of a metal or the like is lowered.

[Polyurethane Resin (c)]

The polyurethane resin (c) has a constituent unit derived from a polyol containing a polyester polyol (a) and a constituent unit derived from a polyisocyanate (b). This polyester polyol (a) has a constituent unit derived from a dicarboxylic acid component and a constituent unit derived from a diol component. The total content of benzene-o-dicarboxylic acid and benzene-m-dicarboxylic acid in the dicarboxylic acid component is 50 mol % or more, preferably 60 mol % or more, still more preferably 80 mol % or more. When the total content of benzene-o-dicarboxylic acid and benzene-m-dicarboxylic acid in the dicarboxylic acid component is less than 50 mol %, the adhesion of a resultant adhesive to a substrate of a metal or the like is lowered.

The content of benzene-o-dicarboxylic acid in the dicarboxylic acid component is 40 mol % or more, preferably 60 mol % or more, further preferably 80 mol % or more. When the content of benzene-o-dicarboxylic acid in the dicarboxylic acid component is less than 40 mol %, the wettability of a resultant adhesive to a substrate is lowered.

Examples of benzene-o-dicarboxylic acid include phthalic acid and phthalic anhydride. Note that an alkyl ester of phthalic acid can also be used as benzene-o-dicarboxylic acid. Examples of benzene-m-dicarboxylic acid include isophthalic acid. Note that an alkyl ester of isophthalic acid can also be used as benzene-m-dicarboxylic acid.

The dicarboxylic acid component may further contain an acid component (additional acid component) other than benzene-o-dicarboxylic acid and benzene-m-dicarboxylic acid. Note that in the case where the content of benzenedicarboxylic acid other than benzene-o-dicarboxylic acid in the dicarboxylic acid component is set to 20 mol % or more, the diol component of the polyester polyol (a) preferably contains a dialcohol having, in the molecule thereof, two or three C≤8 alkylene groups bonded through an ether bond from the viewpoint of making up for lowering the wettability. Further, the content of the dialcohol in the diol component is preferably 50 mol % or more.

As the additional acid component, a conventionally known monocarboxylic acid and polycarboxylic acid can be used. Among others, a dicarboxylic acid having two carboxylate group in one molecule is preferable. Examples of the dicarboxylic acid include naphthalenedicarboxylic acid, adipic acid, azelaic acid, sebacic acid, succinic acid, glutaric acid, maleic acid, itaconic acid, and acid anhydrides and alkyl esters thereof. Among others, adipic acid is preferable. Note that a hydroxycarboxylic acid can be handled in the same manner as in the case of a carboxylic acid according to the total number of functional groups. Specifically, a compound having one carboxylate group and one hydroxy group in one molecule can be used in the same manner as in the case of the dicarboxylic acid. Examples of such a compound include glycolic acid, lactic acid, γ-hydroxybutyric acid, C-hydroxycaproic acid, salicylic acid, and p-hydroxybenzoic acid. In addition, an ester or lactone obtained by dehydrating a hydroxycarboxylic acid can be used as in the case of the hydroxycarboxylic acid.

The content of the additional acid component in the dicarboxylic acid component is preferably 50 mol % or less, more preferably 40 mol % or less, based on the total amount of the dicarboxylic acid component.

The content of the hydroxy group present at each molecular terminal of the polyester polyol (a) (hereinafter, also referred to as "terminal hydroxy group concentration" or "terminal OH group concentration") is 0.1 to 2 mol/kg, preferably 0.2 to 1.5 mol/kg, still more preferably 0.27 to 1.2 mol/kg. When the terminal OH group concentration of the polyester polyol (a) is less than 0.1 mol/kg, the wettability of a resultant adhesive to a substrate is lowered. On the other hand, when the terminal OH group concentration of the polyester polyol (a) is more than 2 mol/kg, the shapeability of a laminate produced using a resultant adhesive is lowered.

The polyurethane resin (c) has a constituent unit derived from a polyol and a constituent unit derived from polyisocyanate (b). The content of the polyester polyol (a) in this polyol is 80% by mass or more, preferably 90% by mass or more, particularly preferably 100% by mass. Specifically, it is particularly preferable that the polyol that forms the polyurethane resin (c) substantially consist of the polyester polyol (a).

The hydroxy group (OH group) is present at molecular terminal of the polyurethane resin (c). The content of the hydroxy group present at each molecular terminal of the polyurethane resin (c) (terminal hydroxy group (OH group) concentration) is 0.04 to 0.4 mol/kg, preferably 0.05 to 0.3 mol/kg, and still more preferably 0.06 to 0.25 mol/kg. When the terminal OH group concentration of the polyurethane resin (c) is less than 0.04 mol/kg, the wettability of a resultant adhesive to a substrate is lowered. On the other hand, when the terminal OH group concentration of the polyurethane resin (c) is more than 0.4 mol/kg, the shapeability of a laminate produced using a resultant adhesive is lowered.

The polyurethane resin (c) has a constituent unit derived from a polyisocyanate (b). As the polyisocyanate (b), a conventionally known polyisocyanate that forms a general polyurethane can be used. The polyisocyanate is preferably a diisocyanate having two isocyanate groups in the molecule thereof and having a molecular weight of 500 or lower. Examples of such a diisocyanate include: aromatic diisocyanates, such as tolylene diisocyanate and diphenylmethane diisocyanate; and aliphatic diisocyanates, such as hexamethylene diisocyanate, pentamethylene diisocyanate, isophorone diisocyanate, and lysine diisocyanate.

The polyester polyol (a) has a constituent unit derived from a diol component. The diol component preferably contains a dialcohol having, in the molecule thereof, two or three C≤8 alkylene groups bonded through an ether bond. By using a dialcohol having such a particular structure, the wettability of a resultant adhesive to a substrate of a resin, a metal, or the like can be improved more.

When the carbon number of the alkylene groups in the dialcohol is too large, the proportion of the constituent unit derived from the dicarboxylic acid component in the polyester polyol (a) decreases relatively. Therefore, the carbon number of the alkylene groups in the dialcohol is 8 or less, preferably 3 or less, still more preferably 2.

In the above-described dialcohol, the number of ether bonds in the molecule is preferably 2 or less, particularly preferably 1. When the number of ether bonds is 3 or more, the proportion of the constituent unit derived from the dicarboxylic acid component in the polyester polyol (a) decreases relatively, so that the heat resistance of a resultant adhesive and the adhesion of the resultant adhesive to a substrate of a metal, a polyester resin, or the like are likely to be lowered.

Examples of the above-described dialcohol include diethylene glycol, triethylene glycol, dipropylene glycol, triethylene glycol, and besides, compounds obtained by ring-opening addition of ethylene, propylene, tetrahydrofuran, or the like to a C≤8 alkylene glycol. Among others, diethylene glycol is preferable.

The content of the above-described dialcohol having a particular structure in the diol component is preferably 50 mol % or more, more preferably 60 mol % or more, and still more preferably 80 mol % or more. By setting the content of the above-described dialcohol having a particular structure in the diol component to 50 mol % or more, the wettability of a resultant adhesive to a substrate of a resin, a metal, or the like can be improved more.

The diol component may further contain an alcohol component other than the above-described dialcohol having a particular structure. As the alcohol component which the diol component may further contain, a conventionally known monoalcohol component or polyalcohol component can be used. Among others, a dialcohol (additional dialcohol, glycol) having two hydroxy groups is preferable.

The polyester polyol (a) can be produced according to a conventionally known method for producing a polyester resin. For example, the polyester polyol (a) can be obtained by subjecting the dicarboxylic acid component and the diol component to a polycondensation reaction at 140 to 250° C. in the presence of an esterification catalyst and an antioxidizing agent which are used as necessary. As the esterification catalyst, an alkoxytitanium-based catalyst is preferably used. As the antioxidizing agent, a phosphorous acid ester-based compound is preferably used.

The polyurethane resin (c) can be produced according to a conventionally known method for producing a polyurethane or a polyurethane urea. For example, the polyurethane resin (c) can be obtained by subjecting the polyester polyol (a) and the polyisocyanate (b) to a polyaddition reaction at normal temperature to 250° C. together with an additional polyol and an active hydrogen compound such as a polyvalent amine compound which are used as necessary. The above-described polyaddition reaction can be carried out in the presence of a urethanization catalyst and an organic solvent as necessary. As the urethanization catalyst, a metal salt-based catalyst, such as a tin, zinc, iron, or bismuth salt-based catalyst, is preferably used. In carrying out the above-described polyaddition reaction, the ratio of the amount (mol) of the NCO group to the amount (mol) of the active hydrogen group, such as a hydroxy group and an amino group, (NCO group/active hydrogen group), is preferably set to 0.1 or more, more preferably 0.4 or more.

(Organic Solvent)

The resin composition of the present embodiment preferably further contains an organic solvent. When the resin composition of the present embodiment further contains an organic solvent, thereby the handling properties (such as easiness of stirring during synthesizing the polyurethane resin and easiness of taking out from a container) as a resin composition can be made satisfactory. As the organic solvent, an organic solvent whose boiling point is 50 to 100° C. is preferably used, and organic solvents such as ethyl acetate, methyl acetate, methyl ethyl ketone, and dimethyl carbonate are preferable from the viewpoints of workability, processability, a low residue, and the like. The content of the organic solvent in the resin composition is preferably 2% by mass or more, more preferably 10 to 70% by mass.

(Additives)

The resin composition of the present embodiment can further contain various additives. Examples of the additives include a pigment, a colorant, a filler, an antimicrobial agent, a dispersant, a stabilizer, an ultraviolet absorber, a coupling agent, a viscosity modifier, an antiblocking agent, a defoamer, a leveling agent, a crosslinking agent, a curing agent, and a perfume.

<Polyurethane-Based Adhesive>

One embodiment of an adhesive of the present invention is a polyurethane-based adhesive containing a base resin and a curing agent, wherein the base resin is the above-described resin composition, and the curing agent is a polyisocyanate (B). Hereinafter, details on the polyurethane-based adhesive of the present embodiment (hereinafter, also simply referred to as "adhesive") will be described.

(Polyisocyanate (B))

The polyisocyanate (B) is a component that functions as the curing agent of the polyurethane-based adhesive and is used together with the above-described resin composition which is the main resin. When the polyol (A) having a hydroxy group and the polyisocyanate (B) having an isocyanate group that chemically reacts with this hydroxy group are mixed, a phenomenon such as a viscosity increase over time or gelation over time is likely to occur, which may make coating of an adherend layer somewhat difficult. For this reason, the adhesive of the present embodiment is preferably, for example, stored and transported in a state before mixing the resin composition and the polyisocyanate (B), that is, in two-component (two-liquid) form. The timing of blending the polyisocyanate (B) into the resin composition is preferably immediately before coating the adherend layer (substrate) with the adhesive.

In the adhesive of the present embodiment, the stoichiometric ratio of the terminal isocyanate group (NCO group) of the polyisocyanate (B) to the terminal hydroxy group (OH group) of the polyol (A) in the resin composition, (NCO group/OH group), is 2.0 to 50.0, preferably 5.0 to 25.0, still more preferably 7.0 to 20.0.

As the polyisocyanate (B), a conventionally known polyisocyanate compound can be used. Specific examples of the polyisocyanate compound include: conventionally known polyisocyanates as polyurethane raw materials or curing agents, adducts of the polyisocyanates, cyanurates of the polyisocyanates, biurets of the polyisocyanates, and polymeric products of the polyisocyanates; and terminal isocyanate-type prepolymers.

(Organic Solvent)

The adhesive of the present embodiment preferably further contains an organic solvent. When the adhesive of the present embodiment further contains an organic solvent, thereby coatability to an adherend layer, such as a film-like or sheet-like substrate, can be improved. Examples of the organic solvent are the same as those of the above-described organic solvents which can be contained in the resin composition.

(Additives)

The adhesive of the present embodiment can further contain various additives. Examples of the additives are the same as those of the above-described additives which can be contained in the resin composition.

(Applications of Adhesive)

The adhesive of the present embodiment is suitable as a material for adhering various substrates (adherend layers) such as various plastic films, metal foils, metal-deposited films, and transparent deposited films. The adhesive of the present embodiment is suitable as a material for producing a laminate in which substrates as described above are laminated and mutually adhered.

<Laminate>

One embodiment of a laminate of the present invention includes: two or more adherend layers; and an adhesive layer provided between these adherend layers and formed with the above-described polyurethane-based adhesive. Hereinafter, details on the laminate of the present embodiment will be described.

(Adherend Layer)

Examples of a substrate to be an adherend layer include: a film, sheet, and foam made of a resin; a film or the like such that a polymeric coating agent such as polyvinylidene chloride is applied on a surface of a film or the like made of a resin; a film and a sheet on which an inorganic matter layer, such as metal-deposited layer, silica-deposited layer, and alumina-deposited layer, is formed; a metal layer, such as an aluminum foil and a copper foil; and besides, a woven fabric, a non-woven fabric, and paper. Examples of the resin for forming a film or the like made of a resin include: polyolefins such as polyethylene and polypropylene; and besides, polystyrene, polyvinyl chloride, polyvinyl alcohol, and ethylene copolymers thereof; polyamides, such as nylon 6; and polyesters, such as polyethylene terephthalate (PET). These substrates may be subjected to surface treatment. Young's modulus (longitudinal elastic modulus) of the adherend layer at 120° C. is preferably 0.05 GPa or more.

Young's moduli (longitudinal elastic moduli) of general vinyl chlorides (flexible PVCs and rigid PVC) at 120° C. are as follows.

Flexible PVC (transparent): 0.01 GPa

Flexible PVC (containing a filler): 0.045 GPa

Rigid PVC (transparent): 0.029 GPa

In the case where the substrate to be an adherend layer is a metal layer, and this metal layer is disposed at a part where shaping is to be performed, the thickness of this metal layer is preferably 15 μm or more, more preferably 25 μm or more.

(Production of Laminate)

The laminate of the present embodiment can be produced according to a conventionally known method except that the above-described adhesive is used. Firstly, a surface of the adherend layer (first substrate) is coated with the adhesive prepared for coating in such a way that the polyisocyanate (B), the organic solvent, and the like are added to the resin composition, and then the organic solvent is removed using a dryer such as a hot air heater to dry the adhesive. Subsequently, another adherend layer (second substrate) is bonded to the first adherend layer, thereafter aging is carried out under predetermined conditions, and thus the intended laminate can be obtained.

Generally, application of an adhesive, drying, bonding, and winding can be continuously performed using a dry laminator while the first substrate and second substrate in the form of roll are unrolled. Examples of the method of coating with the adhesive include a gravure roll coating method, a reverse gravure roll coating method, an offset gravure roll coating method, and a reverse roll coating method.

The aging is a process of curing the applied adhesive by keeping an appropriate temperature condition for a predetermined time for the purpose of allowing the adhesive to exhibit necessary performance such as adhesion and heat resistance. The higher the temperature during the aging, the more the wettability of the adhesive to the substrates is improved and the more the curing reaction rate of the adhesive is improved, so that the time can be shortened. However, when the temperature during the aging is too high, the consumption energy increases, and quality may be likely to be deteriorated depending on the types of the substrates. For this reason, the temperature during the aging is preferably lower than 60° C., still more preferably 35 to 45° C.

In the case where three or more substrates are laminated, the above-described respective processes may be repeated. Note that the aging may be carried out once for a plurality of layers together. In addition, adhesives each having a different composition for each pair of layers to be adhered, or adhesives having the same composition may be used. In the case where a plurality of adhesive layers are formed, at least one of the adhesive layers may be formed with the polyurethane-based adhesive of the present embodiment.

The laminate of the present embodiment can be used, for example, as a general soft packaging material. In addition, the laminate of the present embodiment is excellent in suitability to shaping, and a shaped article (processed article) obtained through shaping is excellent in heat resistance. Therefore, the laminate of the present embodiment is suitable as a material that forms a packaging material (for example, packaging material for food packaging or the like) to be subjected to shaping, such as punching, bending, drawing, and the like, or heat sealing, the packaging material having a shaped portion shaped into a depression.

The heat resistance of a shaped body obtained by subjecting the laminate to shaping can be evaluated by the extent of occurrence of "floating" at the time when parts where residual stress is concentrated are exposed to a high temperature, wherein the parts where residual stress is concentrated include, for example, the boundary portion between the base and the side at the time when a laminated is shaped into a depression by being extended in such a way that a nylon (NY) layer forms the inside, and the boundary portion between a portion shaped into a depression by being extended in such a way that the nylon (NY) layer forms the outside and another surrounding portion, such as a flange portion.

EXAMPLES

Hereinafter, the present invention will specifically be described based on Examples, but the present invention is not limited to these Examples. Note that "parts" and "%" in Examples and Comparative Examples are each on a mass basis unless otherwise noted.

<Synthesis of Polyester Polyol (a)>

Synthesis Example 1

In a flask, 252.2 parts (8 mol) of phthalic anhydride, 62.2 parts (2 mol) of adipic acid, 112.7 parts (4 mol) of 1,6-hexanediol, 74.5 parts (3 mol) of neopentyl glycol (3 mol), and 44.4 (3 mol) of ethylene glycol were charged. The resultant mixture was heated under stirring at 230° C. for 5 hours under a nitrogen gas stream to carry out an esterification reaction while allowing water to flow out. When the outflow of the water stopped, 0.1 parts of tetra-n-butoxytitanium and 0.5 parts of triphenyl phosphite were charged. The temperature of the resultant mixture was increased to 250° C. and the pressure was reduced to 10 Torr to carry out a condensation reaction, and thus polyester polyol (a1) whose terminal hydroxy group (OH group) concentration was 1.0 mol/kg was obtained. Note that the terminal OH group concentration was measured by quantitatively determining acetic acid reacted with the hydroxy group by an acetylation reaction using a pyridine solution of acetic anhydride.

Examples 2 to 6 and 9 to 18

Polyester polyols (a2) to (a6) and (a11) to (a20) were obtained in the same manner as in the case of polyester polyol (a1) described above except that the combinations shown in Tables 1-1 and 1-2 were employed. Physical properties of the obtained polyester polyols are shown in Tables 1-1 and 1-2. The meanings of the abbreviations in Tables 1-1 and 1-2 are described below.

tPA: terephthalic acid
iPA: isophthalic acid
nPA: phthalic anhydride
AA: adipic acid
SA: sebacic acid
16HD: 1,6-hexanediol
EG: ethylene glycol
NPG: neopentyl glycol
DEG: diethylene glycol
BoDC: benzene-o-dicarboxylic acid
BmDC: benzene-m-dicarboxylic acid
BDC: benzenedicarboxylic acid
EDA: dialcohol having, in the molecule thereof, two or three C≤8 alkylene groups bonded through ether bond

Synthesis Example 7

A mixture in which polyester polyol (a4) and polyester polyol (a13) were mixed in a ratio of a4/a13=9/1 (mass ratio) was obtained. Physical properties (average values) of the polyester polyols in the obtained mixture are shown in Table 1-1.

Synthesis Example 8

A mixture in which polyurethane resin (c4) and polyurethane resin (c13), which will be described later, were mixed in a ratio of c4/c13=9/1 (mass ratio) was obtained. Physical properties (average values) of the polyester polyols in the obtained mixture are shown in Table (1-1).

TABLE 1-1

| | | Synthesis Examples | | | | | | | |
|---|---|---|---|---|---|---|---|---|---|
| | | 1 | 2 | 3 | 4 | 5 | 6 | 7 | 8 |
| Polyester polyol (a) | | a1 | a2 | a3 | a4 | a5 | a6 | a4/a13 = | c4/c13 = 9/1 |
| Dicarboxylic acids (mol) | tPA | | | | | | | | |
| | iPA | | | 4 | | | 2 | | |
| | nPA | 8 | 9 | 4 | 9 | 9.5 | 4 | 8.1 | 8.1 |
| | AA | 2 | 1 | 1 | 1 | 0.5 | 4 | 1.4 | 1.4 |
| | SA | | | 1 | | | | 0.5 | 0.5 |
| Diols (mol) | 16HD | 4 | 4 | | | | 4 | | |
| | EG | 3 | 3 | 1 | 1 | 1 | 1 | 1 | 1 |
| | NPG | 3 | 3 | | | 3 | | 0.3 | 0.3 |
| | DEG | | | 9 | 9 | 6 | 5 | 8.7 | 8.7 |
| Total (mol %) of BoDC and BmDC | | 80 | 90 | 80 | 90 | 95 | 60 | 81 | 81 |
| BoDC (mol %) | | 80 | 90 | 40 | 90 | 95 | 40 | 81 | 81 |
| BDC (mol %) other than BoDC | | 0 | 0 | 40 | 0 | 0 | 20 | 0 | 0 |
| EDA (mol %) | | 0 | 0 | 90 | 90 | 60 | 50 | 87 | 87 |
| Terminal OH group concentration (mol/kg) | | 1 | 0.33 | 0.67 | 0.67 | 0.25 | 0.13 | 0.67 | 0.67 |

TABLE 1-2

| | | Synthesis Examples | | | | | | | | | |
|---|---|---|---|---|---|---|---|---|---|---|---|
| | | 9 | 10 | 11 | 12 | 13 | 14 | 15 | 16 | 17 | 18 |
| Polyester polyol (a) | | a11 | a12 | a13 | a14 | a15 | a16 | a17 | a18 | a19 | a20 |
| Dicarboxylic acids (mol) | tPA | | | | | | | 4 | | | |
| | iPA | 7 | 7.5 | | | | | 4 | | 8 | 8 |
| | nPA | | | | 3 | 9 | 9 | | 10 | | |
| | AA | 3 | | 5 | 7 | 1 | 1 | 2 | | 2 | 2 |
| | SA | | 2.5 | 5 | | | | | | | |
| Diols (mol) | 16HD | 4 | 5 | | 4 | 4 | 4 | 4 | | 4 | 4 |
| | EG | 3 | 2 | 1 | 3 | 3 | 3 | 3 | | 3 | 3 |
| | NPG | 3 | 3 | 3 | | 3 | 3 | 3 | | 3 | 3 |
| | DEG | | | 6 | 3 | | | | 10 | | |
| Total (mol %) of BoDC and BmDC | | 70 | 75 | 0 | 30 | 90 | 90 | 40 | 100 | 80 | 80 |
| BoDC (mol %) | | 0 | 0 | 0 | 30 | 90 | 90 | 0 | 100 | 0 | 0 |
| BDC (mol %) other than BoDC | | 70 | 75 | 0 | 0 | 0 | 0 | 80 | 0 | 80 | 80 |
| EDA (mol %) | | 0 | 0 | 60 | 30 | 0 | 0 | 0 | 100 | 0 | 0 |
| Terminal OH group concentration (mol/kg) | | 0.67 | 0.2 | 0.67 | 0.67 | 2.2 | 0.083 | 0.67 | 1.9 | 0.1 | 0.65 |

<Production of Resin Composition>

Example 1

In a flask, 150 parts of polyester polyol (a1), 10.45 parts of tolylene diisocyanate (TDI), 40.11 parts of methyl ethyl ketone (MEK), and 0.075 parts of zinc octylate were charged. A reaction was carried out in the resultant mixture at 80° C. for 7 hours under a nitrogen gas stream, and then 120.34 parts of MEK was added to obtain a solution of polyurethane resin (c1). To the obtained solution of polyurethane resin (c1), 1.6 parts of a silane coupling agent (trade name "KBM-403," manufactured by Shin-Etsu Chemical Co. Ltd.) and 1.6 parts of MEK were added, and the resultant mixture was uniformly mixed to obtain resin composition (R-1).

Example 2

In a flask, 150 parts of polyester polyol (a2), 3.48 parts of TDI, 38.37 parts of MEK, and 0.075 parts of zinc octylate were charged. A reaction was carried out in the resultant mixture at 80° C. for 7 hours under a nitrogen gas stream, and then 115.11 parts of MEK was added to obtain a solution of polyurethane resin (c2). To the obtained solution of polyurethane resin (c2), 1.53 parts of a silane coupling agent (KBM-403) and 1.53 parts of MEK were added, and the resultant mixture was uniformly mixed to obtain resin composition (R-2).

Example 3

In a flask, 150 parts of polyester polyol (a3), 6.97 parts of TDI, 39.24 parts of MEK, and 0.075 parts of zinc octylate were charged. A reaction was carried out in the resultant mixture at 80° C. for 7 hours under a nitrogen gas stream, and then 117.71 parts of MEK was added to obtain a solution of polyurethane resin (c3). To the obtained solution of polyurethane resin (c3), 1.57 parts of a silane coupling agent (KBM-403) and 1.57 parts of MEK were added, and the resultant mixture was uniformly mixed to obtain resin composition (R-3).

Example 4

In a flask, 150 parts of polyester polyol (a4), 6.97 parts of TDI, 39.24 parts of MEK, and 0.075 parts of zinc octylate were charged. A reaction was carried out in the resultant mixture at 80° C. for 7 hours under a nitrogen gas stream, and then 117.7 parts of MEK was added to obtain a solution of polyurethane resin (c4). To the obtained solution of polyurethane resin (c4), 1.57 parts of a silane coupling agent (KBM-403) and 1.57 parts of MEK were added, and the resultant mixture was uniformly mixed to obtain resin composition (R-4).

Example 5

In a flask, 150 parts of polyester polyol (a5), 6.67 parts of isophorone diisocyanate (IPDI), 39.16 parts of ethyl acetate (EA), and 0.075 parts of zinc octylate were charged. A reaction was carried out in the resultant mixture at 80° C. for 7 hours under a nitrogen gas stream, and then 117.50 parts of ethyl acetate (EA) was added to obtain a solution of polyurethane resin (c5). To the obtained solution of polyurethane resin (c5), 1.57 parts of a silane coupling agent (KBM-403) and 1.57 parts of EA were added, and the resultant mixture was uniformly mixed to obtain resin composition (R-5).

Example 6

In a flask, 150 parts of polyester polyol (a6), 3.75 parts of diphenylmethane diisocyanate (MDI), 38.44 parts of methyl acetate (MA), and 0.075 parts of zinc octylate were charged. A reaction was carried out in the resultant mixture at 80° C. for 7 hours under a nitrogen gas stream, and then 116.85 parts of methyl acetate (MA) was added to obtain a solution of polyurethane resin (c6). To the obtained solution of polyurethane resin (c6), 1.54 parts of a silane coupling agent (KBM-403) and 1.54 parts of dimethyl carbonate (DMC) were added, and the resultant mixture was uniformly mixed to obtain resin composition (R-6).

Example 7

In a flask, 135 parts of polyester polyol (a4), 15 parts of polyester polyol (a13), 0.23 parts of 1,3-butanediol (13BD), 0.22 parts of trimethylolpropane (TMP), 5.11 parts of hexamethylene diisocyanate (HDI), 2.85 parts of tolylene diisocyanate (TDI), 39.58 parts of EA, and 0.075 parts of zinc octylate were charged. A reaction was carried out in the resultant mixture at 80° C. for 7 hours under a nitrogen gas stream, and then 120.32 parts of toluene (TOL) was added to obtain a solution of polyurethane resin (c7). To the obtained solution of polyurethane resin (c7), 1.57 parts of a silane coupling agent (KBM-403) and 1.57 parts of TOL were added, and the resultant mixture was uniformly mixed to obtain resin composition (R-7).

Example 8

Resin composition (R-8) was obtained by uniformly mixing 135 parts of the solution of polyurethane resin (c4), 15 parts of a solution of polyurethane resin (c13), 0.75 parts of a silane coupling agent (KBM-403), and 0.75 parts of MEK.

Example 9

Resin composition (R-9) was obtained by adding 5.28 parts of an epoxy resin (trade name "jER 1004," manufactured by Mitsubishi Chemical Corporation), 0.49 parts of a silane coupling agent (KBM-403), and 5.77 parts of MEK to 88 parts of the solution of polyurethane resin (c4) and uniformly mixing the resultant mixture.

Comparative Example 1

In a flask, 150 parts of polyester polyol (a11), 6.97 parts of TDI, 39.24 parts of MEK, and 0.075 parts of zinc octylate were charged. A reaction was carried out in the resultant mixture at 80° C. for 7 hours under a nitrogen gas stream, and then 117.73 parts of MEK was added to obtain a solution of polyurethane resin (c11). To the obtained solution of polyurethane resin (c11), 1.57 parts of a silane coupling agent (KBM-403) and 1.57 parts of MEK were added, and the resultant mixture was uniformly mixed to obtain resin composition (R-11).

Comparative Example 2

In a flask, 150 parts of polyester polyol (a12), 4.18 parts of TDI, 38.55 parts of MEK, and 0.075 parts of zinc octylate were charged. A reaction was carried out in the resultant mixture at 80° C. for 7 hours under a nitrogen gas stream, and then 115.64 parts of MEK was added to obtain a solution of polyurethane resin (c12). To the obtained solution of polyurethane resin (c12), 1.54 parts of a silane coupling agent (KBM-403) and 1.54 parts of MEK were added, and the resultant mixture was uniformly mixed to obtain resin composition (R-12).

Comparative Example 3

In a flask, 150 parts of polyester polyol (a13), 6.97 parts of TDI, 39.24 parts of MEK, and 0.075 parts of zinc octylate were charged. A reaction was carried out in the resultant mixture at 80° C. for 7 hours under a nitrogen gas stream, and then 117.73 parts of MEK was added to obtain a solution of polyurethane resin (c13). To the obtained solution of polyurethane resin (c13), 1.57 parts of a silane coupling agent (KBM-403) and 1.57 parts of MEK were added, and the resultant mixture was uniformly mixed to obtain resin composition (R-13).

Comparative Example 4

In a flask, 150 parts of polyester polyol (a14), 6.97 parts of TDI, 39.24 parts of MEK, and 0.075 parts of zinc octylate were charged. A reaction was carried out in the resultant mixture at 80° C. for 7 hours under a nitrogen gas stream, and then 117.73 parts of MEK was added to obtain a solution of polyurethane resin (c14). To the obtained solution of polyurethane resin (c14), 1.57 parts of a silane coupling agent (KBM-403) and 1.57 parts of MEK were added, and the resultant mixture was uniformly mixed to obtain resin composition (R-14).

Comparative Example 5

In a flask, 150 parts of polyester polyol (a15), 23.23 parts of TDI, 43.31 parts of MEK, and 0.075 parts of zinc octylate were charged. A reaction was carried out in the resultant mixture at 80° C. for 7 hours under a nitrogen gas stream, and then 129.92 parts of MEK was added to obtain a solution of polyurethane resin (c15). To the obtained solution of polyurethane resin (c15), 1.73 parts of a silane coupling agent (KBM-403) and 1.73 parts of MEK were added, and the resultant mixture was uniformly mixed to obtain resin composition (R-15).

Comparative Example 6

In a flask, 150 parts of polyester polyol (a16), 1.74 parts of TDI, 37.94 parts of MEK, and 0.075 parts of zinc octylate were charged. A reaction was carried out in the resultant mixture at 80° C. for 7 hours under a nitrogen gas stream, and then 113.81 parts of MEK was added to obtain a solution of polyurethane resin (c16). To the obtained solution of polyurethane resin (c16), 1.52 parts of a silane coupling agent (KBM-403) and 1.52 parts of MEK were added, and the resultant mixture was uniformly mixed to obtain resin composition (R-16).

Comparative Example 7

In a flask, 150 parts of polyester polyol (a17), 6.97 parts of TDI, 39.24 parts of MEK, and 0.075 parts of zinc octylate were charged to carry out a reaction, but the resultant mixture was not turned into a uniform solution, and therefore a solution of polyurethane resin (c17) was not able to be obtained.

Comparative Example 8

Resin composition (R-18) was obtained by adding 0.5 parts of a silane coupling agent (KBM-403) and 50.5 parts of MEK to 50 parts of polyester polyol (a18) and uniformly mixing the resultant mixture.

Comparative Example 9

In a flask, 1053 parts of polyester polyol (a18) and 73.4 parts of HDI were charged. A reaction was carried out in the resultant mixture at 75° C. for 8 hours under a nitrogen gas stream, and then 1126.4 parts of MEK was added to obtain a solution of polyurethane resin (c18). To the obtained solution of polyurethane resin (c18), 1.13 parts of a silane coupling agent (KBM-403) and 1.13 parts of MEK were added, and the resultant mixture was uniformly mixed to obtain resin composition (R-19).

Comparative Example 10

In a flask, 500 parts of polyester polyol (a20) obtained in Synthesis Example 18, 56 parts of TDI, and 257 parts of ethyl acetate (EA) were charged. A reaction was carried out at 80° C. for 5 hours under a nitrogen gas stream to obtain a prepolymer with terminal diisocyanates, wherein TDI was added to both terminals of the polyester polyol. In another flask, 43.1 parts of trimethylolpropane (TMP) and 713 parts of EA were placed to dissolve TMP uniformly in EA, and then 741.3 parts of the above-described prepolymer with terminal diisocyanates was charged therein under stirring. A reaction was carried out under stirring in the resultant mixture at 80° C. for 5 hours under a nitrogen gas stream, and thus 1 mol of TMP was completely added, by the reaction, per mol of the isocyanate group at both terminals of the prepolymer with terminal diisocyanates. As a result, a solution of polyurethane resin (c19) having a trifunctional or higher functional hydroxy group was obtained.

Resin composition (R-20) was obtained by adding 60 parts of ethyl acetate (EA) to 40 parts of polyester polyol (a19) to mix the result mixture uniformly and then uniformly mixing 25 parts of the solution of the polyurethane resin (a19) and 0.525 parts of a silane coupling agent (KBM-403) thereto.

Tables 2-1 and 2-2 show details on the produced polyurethane resins (c). Tables 3-1 and 3-2 show details on the produced resin compositions.

TABLE 2-1

| | Polyurethane resins (c) | | | | | | |
|---|---|---|---|---|---|---|---|
| | c1 | c2 | c3 | c4 | c5 | c6 | c7 |
| Polyester polyol (a) | a1 | a2 | a3 | a4 | a5 | a6 | a4/a13 = 9/1 |
| Additional polyol | | | | | | | 13BD TMP |
| Polyisocyanate (b) | TDI | TDI | TDI | TDI | IPDI | MDI | HDI/ TDI |
| Terminal OH group concentration (mol/kg) | 0.2 | 0.067 | 0.133 | 0.133 | 0.1 | 0.05 | 0.104 |

TABLE 2-2

| | Polyurethane resins (c) | | | | | | | | |
|---|---|---|---|---|---|---|---|---|---|
| | c11 | c12 | c13 | c14 | c15 | c16 | c17 | c18 | c19 |
| Polyester polyol (a) | a11 | a12 | a13 | a14 | a15 | a16 | a17 | a18 | a19 |
| Additional polyol | | | | | | | | | TMP |
| Polyisocyanate (b) | TDI | TDI | TDI | TDI | TDI | TDI | TDI | HDI | TDI |
| Terminal OH group concentration (mol/kg) | 0.133 | 0.08 | 0.133 | 0.133 | 0.444 | 0.033 | Synthesis impossible | 1 | 1.075 |

TABLE 3-1

| | Examples | | | | | | | | |
|---|---|---|---|---|---|---|---|---|---|
| | 1 | 2 | 3 | 4 | 5 | 6 | 7 | 8 | 9 |
| Resin composition | R-1 | R-2 | R-3 | R- 4 | R-5 | R-6 | R-7 | R-8 | R-9 |
| Polyurethane resin (c) | c1 | c2 | c3 | c4 | c5 | c6 | c7 | c4/c13 = 9/1 | c4 |
| Additional resin | | | | | | | | | jER 1004 |
| Proportion (%) of polyurethane resin (c) in polyol (A) | 100 | 100 | 100 | 100 | 100 | 100 | 100 | 100 | 89.2 |
| Additive | KBM-403 | KBM-403 | KBM-403 | KBM-403 | KBM-403 | KBM-403 | KBM-403 | KBM-403 | KBM-403 |

TABLE 3-1-continued

| | Examples | | | | | | | | |
|---|---|---|---|---|---|---|---|---|---|
| | 1 | 2 | 3 | 4 | 5 | 6 | 7 | 8 | 9 |
| Organic solvent | MEK | MEK | MEK | MEK | EA | DMC/MA | TOL/EA | MEK | MEK |
| Viscosity (mPa · s/25° C.) | 110 | 500 | 210 | 130 | 350 | 4,300 | 1,800 | 120 | 110 |
| Non-volatile component (%) | 50 | 50 | 50 | 50 | 50 | 50 | 50 | 50 | 50 |

TABLE 3-2

| | Comparative Examples | | | | | | | | |
|---|---|---|---|---|---|---|---|---|---|
| | 1 | 2 | 3 | 4 | 5 | 6 | 8 | 9 | 10 |
| Resin composition | R-11 | R-12 | R-13 | R-14 | R-15 | R-16 | R-18 | R-19 | R-20 |
| Polyurethane resin (c) | c11 | c12 | c13 | c14 | c15 | c16 | | c18 | c19 |
| Additional resin | | | | | | | a18 | | a19 |
| Proportion (%) of polyurethane resin (c) in polyol (A) | 100 | 100 | 100 | 100 | 100 | 100 | 0 | 100 | 23.8 |
| Additive | KBM-403 | KBM-403 | KBM-403 | KBM-403 | KBM-403 | KBM-403 | KBM-403 | KBM-403 | KBM-403 |
| Organic solvent | MEK | MEK | MEK | MEK | MEK | MEK | MEK | MEK | EA |
| Viscosity (mPa · s/25° C.) | 2,100 | 5,500 | 90 | 3,000 | 50 | 2,400 | 20 | 30 | 410 |
| Non-volatile component (%) | 50 | 50 | 50 | 50 | 50 | 50 | 50 | 50 | 42.2 |

<Production of Adhesive>

Examples 10 to 19 and Comparative Examples 11 to 21

Adhesives U1 to U21 were obtained by mixing the components shown in Tables 4-1 and 4-2. The meanings of the abbreviations in Tables 4-1 and 4-2 are described below.

D-103: isocyanate-based curing agent (trade name "TAKENATE D-103," manufactured by Mitsui Chemicals, Inc., polyisocyanate)

HL: isocyanate-based curing agent (trade name "CORONATE HL," manufactured by Tosoh Corporation, polyisocyanate)

TPA-100: isocyanate-based curing agent (trade name "DURANATE TPA-100," manufactured by Asahi Kasei Corporation, polyisocyanate)

D-165N: isocyanate-based curing agent (trade name "TAKENATE D-165N," manufactured by Mitsui Chemicals, Inc., polyisocyanate)

HX: isocyanate-based curing agent (trade name "CORONATE HX," manufactured by Tosoh Corporation, polyisocyanate)

D-165N/HX: mixture of D-165N and HX in mass ratio of 1/1

TABLE 4-1

| | | Examples | | | | | | | | | |
|---|---|---|---|---|---|---|---|---|---|---|---|
| | | 10 | 11 | 12 | 13 | 14 | 15 | 16 | 17 | 18 | 19 |
| Adhesive | | U1 | U2 | U3 | U4 | U5 | U6 | U7 | U8 | U9 | U10 |
| Resin composition | Type | R-1 | R-2 | R-3 | R-4 | R-5 | R-6 | R-7 | R-8 | R-9 | R-4 |
| | Terminal OH group concentration (mol/kg solution) | 0.1 | 0.033 | 0.067 | 0.067 | 0.05 | 0.025 | 0.052 | 0.067 | 0.098 | 0.067 |
| | Amount (parts) | 30 | 30 | 30 | 30 | 30 | 30 | 30 | 30 | 30 | 30 |
| Curing agent | Type | D-103 | D-103 | D-103 | D-103 | D-103 | D-103 | HL | D-103 | TPA-100 | D-103 |
| | NCO concentration (mol/kg solution) | 3.1 | 3.1 | 3.1 | 3.1 | 3.1 | 3.1 | 3.05 | 3.1 | 5.52 | 3.1 |
| | Non-volatile component (%) | 75 | 75 | 75 | 75 | 75 | 75 | 75 | 75 | 100 | 75 |
| | Amount (parts) | 5 | 5 | 5 | 5 | 5 | 5 | 5 | 5 | 5 | 15 |
| Organic solvent | Type | MEK | MEK | MEK | MEK | MEK | MEK | MEK | MEK | MEK | MEK |
| | Amount (parts) | 40 | 40 | 40 | 40 | 40 | 40 | 40 | 40 | 45 | 60 |
| Total (parts) | | 75 | 75 | 75 | 75 | 75 | 75 | 75 | 75 | 80 | 105 |
| NCO group/OH group (molar ratio) | | 5.16 | 15.48 | 7.74 | 7.74 | 10.32 | 20.63 | 9.77 | 7.74 | 9.39 | 23.21 |

TABLE 4-2

| | | Comparative Examples | | | | | | | | | | |
|---|---|---|---|---|---|---|---|---|---|---|---|---|
| | | 11 | 12 | 13 | 14 | 15 | 16 | 17 | 18 | 19 | 20 | 21 |
| Adhesive | | U11 | U12 | U13 | U14 | U15 | U16 | U17 | U18 | U19 | U20 | U21 |
| Resin composition | Type | R-11 | R-12 | R-13 | R-14 | R-15 | R-16 | R-1 | R-1 | R-18 | R-19 | R-20 |
| | Terminal OH group concentration (mol/kg solution) | 0.067 | 0.04 | 0.067 | 0.067 | 0.222 | 0.017 | 0.1 | 0.1 | 0.95 | 0.5 | 0.078 |
| | Amount (parts) | 30 | 30 | 30 | 30 | 30 | 30 | 30 | 30 | 20 | 20 | 100 |
| Curing agent | Type | D-103 | D-103 | D-103 | D-103 | D-103 | D-103 | D-103 | D-103 | D-165N | D-165N/HX | D-103 |
| | NCO concentration (mol/kg solution) | 3.1 | 3.1 | 3.1 | 3.1 | 3.1 | 3.1 | 3.1 | 3.1 | 5.595 | 5.33 | 3.1 |
| | Non-volatile component (%) | 75 | 75 | 75 | 75 | 75 | 75 | 75 | 75 | 100 | 100 | 75 |
| | Amount (parts) | 5 | 5 | 5 | 5 | 5 | 5 | 1 | 60 | 4 | 4 | 9.7 |
| Organic solvent | Type | MEK | MEK | MEK | MEK | MEK | MEK | MEK | MEK | MEK | MEK | EA |
| | Amount (parts) | 40 | 40 | 40 | 40 | 40 | 40 | 32 | 90 | 32 | 32 | 87 |
| Total (parts) | | 75 | 75 | 75 | 75 | 75 | 75 | 63 | 180 | 56 | 56 | 196.7 |
| NCO group/OH group (molar ratio) | | 7.74 | 12.9 | 7.74 | 7.74 | 2.32 | 30.95 | 1.03 | 61.9 | 1.18 | 2.13 | 2 |

<Production of Laminate>

Examples 20 to 29 and Comparative Examples 22 to 32

The adhesive was applied on one substrate with a bar coater #12 and then dried in a hot air drying furnace set at 80° C. The other substrate was placed on the dried adhesive to bond the substrates by roll pressure bonding. Thereafter, the bonded substrates were subjected to aging at 40° C. for 5 days to obtain laminates (L1) to (L21). The substrates which were used are described below.

NY #15: nylon film, trade name "EMBLEM ON," manufactured by UNITIKA LTD., thickness 15 μm, Young's modulus 0.45 GPa (120° C.)

NY #25: nylon film, trade name "EMBLEM ON," manufactured by UNITIKA LTD., thickness 25 μm, Young's modulus 0.45 GPa (120° C.)

RCPP #60: retort-type (heat resistant-type) casted polypropylene film, trade name "PYLEN Film-CT P1146," manufactured by TOYOBO Co., Ltd., thickness 60 μm, Young's modulus 0.061 GPa (120° C.)

AL #100: aluminum foil, trade name "Bare Foil A1N30," manufactured by UACJ Corporation, thickness 100 μm, Young's modulus 65 GPa (120° C.)

<Evaluations>

(Heat Sealing)

The RCPP layers of the laminates (NY #15/RCPP #60) were brought into close contact with each other and pressure-bonded with hot plates set at 200° C. from the NY layer sides for 1 second to heat-seal the laminates, and thus a packaging material was produced.

(Retort Test)

A retort test was conducted, in which Mayonnaise was put into the produced packaging material, and the packaging material was sealed up and heated at 120° C. for 30 minutes.

(Appearance of Laminate)

The produced laminates were visually observed to evaluate the appearances of the laminates according to the evaluation criteria described below. The results are shown in Tables 5-1 and 5-2.

$A^+$: Very good

A: Good (slight deterioration in transparency or luminance is recognized)

B: Small floating occurs

C: Large floating or peeling occurs (Measurement of Peel Strength/Seal Strength)

A test piece of a thin rectangle having a width of 15 mm was cut out from each of the produced laminates. The peel strength (N/15 mm) of the test piece was measured by the T-peel test under a condition of a speed between chucks of 300 mm/min. Similarly, a test piece of a thin rectangle having a width of 15 mm was cut out from each of the heat-sealed portions to measure the seal strength (N/15 mm). The results are shown in Tables 5-1 and 5-2. In Tables 5-1 and 5-2, "fa" means that peeling occurred at the interface between the NY layer and the adhesive layer, "aa" means that the adhesive layer was peeled (by cohesive peeling), and "am" means that peeling occurred at the interface between the adhesive layer and the metal layer (aluminum foil).

(Shapeability)

A test piece having a diameter of 6 cm was cut out from the produced laminate (NY #25/AL #100). A deep-drawing tester equipped with a punch (diameter: 30 mm, r of shoulder portion: 1 mm) was used to perform drawing so as to face the NY layer side of the test piece inside, and thus a shaped body having a depression with a depth of 5 mm formed thereon was obtained. The resultant shaped body was visually observed to evaluate the shapeability according to the evaluation criteria described below. The results are shown in Tables 5-1 and 5-2.

A: Good

C: Floating or peeling occurs (Heat Resistance after Shaping)

The shaped body prepared in the evaluation of "Shapeability," described above, was left to stand still for 1 hour in each of thermostatic chambers set at 120° C., 160° C., and 200° C. respectively in sequence. The connecting portion between the base and side on the internal surface side of the depression of the shaped body taken out of the thermostatic chamber was visually observed to evaluate the heat resistance after shaping according to the evaluation criteria described below. The results are shown in Tables 5-1 and 5-2.

A: Floating does not occur

B: Floating with a longer diameter of less than 0.5 mm occurs

C: Floating or peeling with a longer diameter of 0.5 mm or larger occurs

TABLE 5-1

| | | Examples | | | | | | | | | |
|---|---|---|---|---|---|---|---|---|---|---|---|
| | | 20 | 21 | 22 | 23 | 24 | 25 | 26 | 27 | 28 | 29 |
| Laminate | | L1 | L2 | L3 | L4 | L5 | L6 | L7 | L8 | L9 | L10 |
| Adhesive | | U1 | U2 | U3 | U4 | U5 | U6 | U7 | U8 | U9 | U10 |
| Appearance of laminate | NY#15/RCPP#60 | A | A | A$^+$ | A$^+$ | A$^+$ | A | A$^+$ | A$^+$ | A$^+$ | A$^+$ |
| | NY#25/AL#100 | A | A | A$^+$ | A$^+$ | A$^+$ | A | A$^+$ | A$^+$ | A$^+$ | A$^+$ |
| | NY#15/RCPP#60 (after retort test) | A | A | A$^+$ | A$^+$ | A$^+$ | A | A$^+$ | A$^+$ | A$^+$ | A$^+$ |
| Peel strength (N/15 mm) | NY#15/RCPP#60 | 11.2 fa | NY Broken | NY Broken | 10.9 fa | 11.1 fa | 11.3 fa | 10.8 fa | 11.6 fa | 11.6 fa | 11.6 fa |
| | NY#25/AL#100 | NY Broken | NY Broken | NY Broken | NY Broken | NY Broken | NY Broken | NY Broken | NY Broken | NY Broken | NY Broken |
| | NY#15/RCPP#60 (after retort test) | 12 fa | NY Broken | NY Broken | 12 fa | 12.2 fa | 12.1 fa | 12 fa | 11.9 fa | 12 fa | 12.3 fa |
| seal strength (N/15 mm) | NY#15/RCPP#60 (after heat sealing) | 54 | 56 | 52 | 53 | 53 | 52 | 54 | 55 | 54 | 56 |
| | NY#15/RCPP#60 (after heat sealing and retort test) | 43 | 47 | 44 | 45 | 46 | 48 | 45 | 42 | 45 | 47 |
| Shapeability | | A | A | A | A | A | A | A | A | A | A |
| Heat resistance after shaping | 120° C. | A | A | A | A | A | A | A | A | A | A |
| | 160° C. | A | A | A | A | A | A | A | A | A | A |
| | 200° C. | A | A | A | A | A | C | A | A | A | A |

TABLE 5-2

| | | Comparative Examples | | | | | | | | | | |
|---|---|---|---|---|---|---|---|---|---|---|---|---|
| | | 22 | 23 | 24 | 25 | 26 | 27 | 28 | 29 | 30 | 31 | 32 |
| Laminate | | L11 | L12 | L13 | L14 | L15 | L16 | L17 | L18 | L19 | L20 | L21 |
| Adhesive | | U11 | U12 | U13 | U14 | U15 | U16 | U17 | U18 | U19 | U20 | U21 |
| Appearance of laminate | NY#15/RCPP#60 | B | B | A$^+$ | A | A$^+$ | A | A$^+$ | C | A$^+$ | A$^+$ | B |
| | NY#25/AL#100 | B | B | A$^+$ | A | A$^+$ | A | A$^+$ | C | A$^+$ | A$^+$ | B |
| | NY#15/RCPP#60 (after retort test) | B | B | C | C | A$^+$ | A | A$^+$ | C | A$^+$ | A$^+$ | B |
| Peel strength (N/15 mm) | NY#15/RCPP#60 | 11.7 fa | 11.5 fa | 10.7 fa | 10.9 fa | 10.4 fa | 11.1 fa | 3.7 aa | 9.2 fa | 10.1 fa | 10.3 fa | 11.8 fa |
| | NY#25/AL#100 | 3.9 fa | 3.8 fa | 2.6 am | 3.1 am | 3.4 fa | NY Broken | 2.1 aa | 2.9 fa | 3.2 am | 3.3 am | NY Broken |
| | NY#15/RCPP#60 (after retort test) | 12 fa | 12 fa | 11.3 fa | 12.1 fa | 12 fa | 11.9 fa | 3.6 aa | NY Broken | 11.2 fa | 11.5 fa | 11.9 fa |
| seal strength (N/15 mm) | NY#15/RCPP#60 (after heat sealing) | 52 | 53 | 51 | 54 | 46 | 53 | 32 | 45 | 44 | 47 | 45 |
| | NY#15/RCPP#60 (after heat sealing and retort test) | 42 | 43 | 39 | 59 | 37 | 44 | 25 | 38 | 36 | 38 | 41 |
| Shapeability | | A | A | C | C | C | A | C | C | C | C | A |
| Heat resistance after shaping | 120° C. | A | C | — | — | — | A | — | — | — | — | A |
| | 160° C. | C | — | — | — | — | C | — | — | — | — | C |
| | 200° C. | — | — | — | — | — | — | — | — | — | — | — |

INDUSTRIAL APPLICABILITY

The resin composition of the present invention is useful as a material for producing, for example, a laminate that forms a packaging material for food packaging applications and the like which is subjected to drawing molding or heat sealing.

The invention claimed is:

1. A resin composition to be used as a base resin of an adhesive together with a curing agent, the resin composition being a resin composition for a polyurethane-based adhesive and comprising a polyol (A) that comprises 80% by mass or more of a polyurethane resin (c) having a hydroxy group at each molecular terminal of the polyurethane resin (c), the polyurethane resin (c) having a constituent unit derived from a polyol comprising a polyester polyol (a) and a constituent unit derived from a polyisocyanate (b), wherein the polyester polyol (a) has a constituent unit derived from a dicarboxylic acid component and a constituent unit derived from a diol component, the total content of benzene-o-dicarboxylic acid and benzene-m-dicarboxylic acid in the dicarboxylic acid component is 50 mol % or more, the content of benzene-o-dicarboxylic acid in the dicarboxylic acid component is 40 mol % or more, the content of a hydroxy group present at each molecular terminal of the polyester polyol (a) is 0.1 to 2 mol/kg, the content of the polyester polyol (a) in the polyol is 80% by mass or more, and the content of the hydroxy group present at each molecular terminal of the polyurethane resin (c) is 0.04 to 0.4 mol/kg.

2. The resin composition according to claim 1, wherein the content of the hydroxy group present at each molecular terminal of the polyurethane resin (c) is 0.05 to 0.4 mol/kg.

3. The resin composition according to claim 1, wherein the content of benzenedicarboxylic acid other than benzene-o-dicarboxylic acid in the dicarboxylic acid component is 20 mol % or more.

4. The resin composition according to claim 1, wherein the diol component comprises a dialcohol having, in the molecule thereof, two or three C≤8 alkylene groups bonded through an ether bond, and the content of the dialcohol in the diol component is 50 mol % or more.

5. The resin composition according to claim 1, further comprising 2% by mass or more of at least one organic solvent selected from the group consisting of ethyl acetate, methyl acetate, methyl ethyl ketone, and dimethyl carbonate.

6. A polyurethane-based adhesive comprising:

a base resin; and a curing agent, wherein the base resin is the resin composition according to claim 1, the curing agent is a polyisocyanate (B), and the stoichiometric ratio of a terminal isocyanate group (NCO group) of the polyisocyanate (B) to the terminal hydroxy group (OH group) of the polyol (A), (NCO group/OH group), is 2.0 to 50.0.

7. A laminate comprising:

two or more adherend layers; and an adhesive layer provided between the adherend layers and formed with the polyurethane-based adhesive according to claim 6.

8. The laminate according to claim 7, wherein the adherend layers comprises a metal layer.

9. The laminate according to claim 7, having a shaped portion shaped into a depression.

10. The laminate according to claim 7, having a sealed portion subjected to heat sealing.

* * * * *